US006603975B1

(12) United States Patent
Inouchi et al.

(10) Patent No.: US 6,603,975 B1
(45) Date of Patent: Aug. 5, 2003

(54) COMMUNICATION CONTROL METHOD OF CONTROLLING DATA FLOW FROM INTERNET PROTOCOL NETWORK TO MOBILE TERMINAL

(75) Inventors: Hidenori Inouchi, Higashimurayama (JP); Takumi Ohishi, Kokubunji (JP)

(73) Assignee: HItachi, Ltd., Tokyo (JP)

( * ) Notice: Subject to any disclaimer, the term of this patent is extended or adjusted under 35 U.S.C. 154(b) by 0 days.

(21) Appl. No.: 09/514,322

(22) Filed: Feb. 28, 2000

(30) Foreign Application Priority Data

Apr. 2, 1999 (JP) ............................................ 11-095680

(51) Int. Cl.[7] ................................................ H04Q 7/20
(52) U.S. Cl. ....................... 455/450; 455/464; 320/468
(58) Field of Search ................................ 455/450, 451, 455/452, 453, 405, 464, 465, 468, 433; 370/465, 468

(56) References Cited

U.S. PATENT DOCUMENTS

| | | | | |
|---|---|---|---|---|
| 5,946,633 A | * | 8/1999 | McAlinden | 370/468 |
| 6,031,845 A | * | 2/2000 | Walding | 370/335 |
| 6,137,787 A | * | 10/2000 | Chawla et al. | 370/337 |
| 6,148,209 A | * | 11/2000 | Hamalainen et al. | 370/329 |
| 6,216,006 B1 | * | 4/2001 | Scholefield et al. | 455/422 |

OTHER PUBLICATIONS

ETSI Digital Cellular Telecommunications System (Phase 2+), "GSM 03.60 Stage 2 Service Description of the General Packet Radio Service (GPRS)", (10/89), European Standard (Telecommunications Series), pp. 1–8, 19–23.

"Easy to understand Digital Exchange", issued by Telecommunications Association, May 1994, pp. 29–30.

"Mobile Communication Handbook" issued by Ohm–sha, 1997 pp. 217–251 and pp. 301–326.

Easy to understand Digital Mobile Communication issued by Telecommunication Association, 1997 pp. 32–36.

Toward Realization of 2M bit/s High Speed Mobile Communication aiming Asia Standard of 2000 year, Nikkei Electronics, No. 680, Jan. 1997 issued by Nikkei BP Co., pp. 85–90.

Basic knowledge of data transfer issued by Telecommunication Association 1997 pp. 128–133.

B–ISDN Textbook with pictures, issued by Ohm–sha, 1997 pp. 64–79.

Mastering TCP/IP, Introduction, issued by Ohm–sha, 1997 pp. 98–103.

* cited by examiner

Primary Examiner—Thanh Cong Le
Assistant Examiner—Tsuleun R Lei
(74) Attorney, Agent, or Firm—Antonelli, Terry, Stout & Kraus, LLP

(57) ABSTRACT

A traffic controller determines flow control parameters regarding a packet transfer in the downward direction based on traffic amount information for each application measured by a traffic monitor, communication quality information in the radio zone collected by a wireless base station for communication with a mobile terminal, and communication quality information of each application collected by a subscriber exchange and notifies the flow control parameters to the subscriber exchange.

3 Claims, 5 Drawing Sheets

Figure 4

| CH_ID | PERIOD | THRESHOLD |
|---|---|---|
| 1 | 100 | 32kbps |
| 2 | 50 | 64kbps |
| 3 | 200 | 256kbps |
| 4 | 10 | 32kbps |
| 5 | 100 | 16kbps |
| 6 | 100 | 32kbps |
| 7 | 100 | 32kbps |
|   |   |   |

COMMUNICATION CONTROL METHOD OF CONTROLLING DATA FLOW FROM INTERNET PROTOCOL NETWORK TO MOBILE TERMINAL

BACKGROUND OF THE INVENTION

1. Field of the Invention

The present invention relates to a communication network control system and, more particularly, to a flow control in a packet exchange for switching an IP (Internet Protocol) packet in the downward direction transmitted from the Internet to a mobile terminal.

2. Description of Related Art

Current communication networks include not only a conventional wire communication network using metallic line or optical fiber but also a communication network such as a mobile communication network using radio as media of signal transmission. The mobile communication network includes:

(1) a PDC (Personal Digital Cellular) for transmitting a signal in a time slot in a manner similar to an existing STM (Synchronous Transfer Mode) communication network (a time division communication network for transmitting a signal in time slots which are time-divided in synchronized frames as described in p. 29–30 of "Easy-to-understand digital exchange" issued by The Telecommunications Association) as described in p. 217–251 and 301–326 in "Mobile Communication Handbook" issued by Ohm-sha;

(2) a PHS (Personal Handyphone System) communication network; and (3) a CDMA (Code Division Multiple Access) communication network for modulating a signal by using a code different according to each signal and transmitting the modulated signal as described in p. 32–36 in "Easy-to-understand Digital Mobile Communication" issued by The Telecommunications Association.

Among them, a wide band CDMA (W-CDMA) described from page 85 in "Nikkei Electronics", No. 680 issued by Nikkei BP Co. is a communication network which is expected to be a communication system capable of transmitting and receiving signals of various kinds and speeds such as voice, image, and high-speed data with quality similar to that of the existing wire communication network even if the user terminal moves at high speed. The communication network is expected to be rapidly introduced in future.

On the other hand, current communication networks include various communication networks such as: the STM communication network; a packet communication network for transmitting a signal on a variable length packet, described in p. 128–133 in "Basic knowledge of data transfer" issued by The Telecommunications Association; an ATM (Asynchronous Transfer Mode) communication network for transmitting a signal on a fixed length packet called a cell, described in p. 64–79 in "B-ISDN textbook with pictures" issued by Ohm-sha; and the IP network (Internet) for transmitting an IP packet in accordance with the procedure called the Internet protocol (IP) by sending a signal on a variable length packet called an IP packet described in p. 98–103 10 in "Mastering TCP/IP, Introduction" issued by Ohm-sha. In each of the communication networks, media of voice, image and data are transmitted/received.

In recent years, a mobile packet network such as the Internet and a PDC-P (PDC-Packet) has been greatly introduced. In the Internet protocol (refer to RFC791, as per Internet Engineering Task Force) used on the Internet as a de facto standard communication protocol in the packet communication, controlling of a communication bandwidth of data or the like has not been examined in consideration of a data flow. That is, the most primitive method of transmitting data as much as possible unless a transmission path is congested in accordance with the order of arrival of data and transmitting no data when the transmission path is congested is used.

The method has a problem that a data flow of data such as a moving picture which should not be delayed but may be dropped a little and a data flow of data such as an electronic mail which may be delayed but should be complete cannot be dealt separately. In other words, the characteristic of the data flow is ignored. Especially, at the time of congestion, the problem is fatal. When data is not dealt according to the characteristic of the data flow, data to be preferentially sent when the transmission path is congested cannot be determined. An unpreferable situation such that an electronic mail which may be delayed is transmitted before a moving picture which should not be delayed can occur.

It is therefore considered that improvement on this point will be necessary in future by, for example, allocating a bandwidth to transmission of moving pictures wider than that of electronic mail so as to transmit the moving picture first. In the communication network in the next generation, it is presumed that a QoS (Quality of Service) control such as a control on a data transmission bandwidth is an important technique.

The Internet, however, originally lacks a function of supporting a mobile terminal on the network side. In the case of transmitting the IP packet from a fixed terminal on the Internet side to a mobile terminal on a mobile communication network side, especially, the fixed terminal performs a packet transmission without considering whether the data flow is for a mobile terminal or not.

A wireless access network peculiar to the mobile communication network positioning between a mobile terminal and a subscriber exchange on the mobile communication network side accommodates a number of mobile terminals and the bandwidth in the radio zone is narrow. Consequently, an upper limit is set so that the bandwidth in the wire zone allocated to each IP data flow does not exceed the channel bandwidth in the radio zone.

In order to prevent occurrence of an overflow of data in a wireless base station or the like for performing interwork between the wire zone and the radio zone, in the subscriber exchange on the mobile communication network side, it is necessary to perform a flow control (an example of the QoS control) on the flow of data entering from the Internet in the downward direction, of which bandwidth is not limited.

A specification required for the packet exchange service in the mobile communication network is being formed by including the flow control for each data flow in the downward direction. As an example, various service requirements are defined in documents in the IMT-2000 system based on the GPRS method (ETSI: GSM 03.60 Stage 2 Service Description of the General Packet Radio Service (GPRS)). The QoS control includes a bandwidth control, a delay control, a priority control, and a reliability control. It is presumed that the importance of the QoS control system for each data flow of a packet transmitted from a fixed terminal on the Internet side to the mobile terminal on the IMT-2000 system will be increased with the spread of the mobile packet communication in future.

As mentioned above, the flow control for the conventional IP data flow is performed by adjusting the traffic amount.

Specifically, traffic of the IP data flow is actually measured by an intermediate exchange. When the traffic amount tends to increase, a radio channel is switched to a channel of a wider bandwidth and, simultaneously, an increase in the flow in the wire zone is permitted within the radio resources allowable range. The traffic which can be measured by the intermediate exchange is classified into effective traffic to be actually flowed and retransmission traffic occurring in association with degradation in the communication quality in the radio zone or the like.

Since the packet is encrypted and compressed in the mobile communication network, when the retransmission traffic increases, it is very difficult to distinguish between the retransmission traffic and the effective traffic in the intermediate exchange. Consequently, the exchange regards that the traffic of the IP data flow sent from the Internet increases.

As described above, when an ordinary flow control is executed on the basis of only the measured traffic amount, in the conventional flow control system for permitting the increase in traffic entering from the Internet side, a data loss frequently occurs in an apparatus such as a wireless base station having a small buffer capacity. As a result, the retransmission traffic further increases and the data loss more frequently occurs.

In order to solve the problem, it is necessary to execute the flow control by using the radio communication quality information, communication quality information classified into retransmission traffic and effective traffic, and traffic amount information.

SUMMARY OF THE INVENTION

An object of the invention is to provide a communication control system in a mobile communication network which is connected to the Internet and realizes the IP packet switching, including: (1) a unit for efficiently measuring a traffic amount of each data flow by an intermediate exchange; and (2) a practical flow control unit based on communication quality information in a radio zone provided by a wireless base station, communication quality information of, each of data flow classified into retransmission traffic and effective traffic provided by a subscriber exchange, and a traffic amount of each data flow measured by a base station controller.

The communication control system according to the invention operates as follows. The wireless base station converts radio quality information carried on a data frame in the upward direction transmitted from a mobile terminal to the wireless base station into a data format used in the wire zone and notifies a base station controller of the converted information. A traffic monitor measures the traffic amount of the data frame in the downward direction transmitted from a subscriber exchange to a mobile terminal classifying into the retransmission traffic amount and the effective traffic amount for each data flow. The subscriber exchange collects the communication quality information for each data flow and notifies a traffic controller of the collected information.

The base station controller determines whether the radio channel has to be switched or not generally from the traffic amount in the downward direction of each measured data flow, the communication quality in the radio zone, and the communication quality of each data flow between the mobile terminal and the subscriber exchange.

When it is determined that the radio channel has to be switched, the base station controller switches the data channel of the mobile terminal and the wireless base station. After switching the channel, the subscriber exchange executes the flow control in the downward direction. When the communication quality in the radio zone and the communication quality between the mobile terminal and the subscriber exchange are preferable and an increase in the data flow in the downward direction is observed, the flow control in the downward direction is carried out by promptly increasing the bandwidth of the data flow in the downward direction in the subscriber exchange.

A process in a case where degradation in the communication quality is reported is performed as follows. The factors requiring a report of the degradation in the communication quality in the radio zone to the subscriber exchange include (1) power down or failure in the mobile terminal, (2) degradation in a radio wave state, and (3) power down or failure in the wireless base station. In the cases of (1) and (2), the radio communication quality or air quality information of each terminal is reported to the radio base controller. In the case of (2), since the radio communication quality information is not reported to the base station controller for a certain period, it is regarded that the radio communication quality information of all of terminals deteriorates.

The factors requiring a report of the degradation in the communication quality between the mobile terminal and the subscriber exchange include (1) a data loss caused in association with the power down, failure, or movement of the mobile terminal, (2) degradation in the radio wave state, (3) power down, failure, or the like of the wireless base station, and (4) buffer overflow on the subscriber exchange side.

As described above, there is the high correlation between the communication quality information between the mobile terminal and the subscriber exchange and the communication quality information in the radio zone. The degradation in the communication quality due to an increase in the retransmission traffic caused by a data loss which occurs when the communication is temporarily interrupted in association with roaming does not depend on the communication quality in the radio zone. In the mobile packet communication system in which a perfect handover mechanism has not been realized, the data loss due to the movement occurs the most and is measured as degradation in the communication quality in the subscriber exchange.

The degradation in the communication quality which occurs in association with the roaming can be measured by the base station controller from the radio communication quality information sent from the wireless base station and the communication quality information sent from the subscriber exchange at the same time. To be specific, when the degradation in the communication quality is reported from the subscriber exchange and no degradation in the radio communication quality is reported from the wireless base station, it may be determined that the data loss in association with the roaming has occurred, and a signal to start the flow control process is sent also to the subscriber exchange. In this case, it is desirable to temporarily interrupt the data transmission.

If the flow control in the downward direction is determined by the subscriber exchange, it is necessary to collect the radio communication quality information from all of wireless base stations under the subscriber exchange. In this case, not only the traffic of signals passing through the line is increased but also a processing load on the subscriber exchange side increases. It is the most efficient, therefore, that the base station controller starts a channel switching process and a flow control process. By sharing and performing the channel switching process and the flow control process by the base station controllers, a well-balanced communication control system having the high practicability can be constructed.

BRIEF DESCRIPTION OF THE DRAWINGS

FIG. 4 is a diagram showing an example of a format of a traffic monitoring parameter table.

DESCRIPTION OF THE PREFERRED EMBODIMENTS

Figure 1:
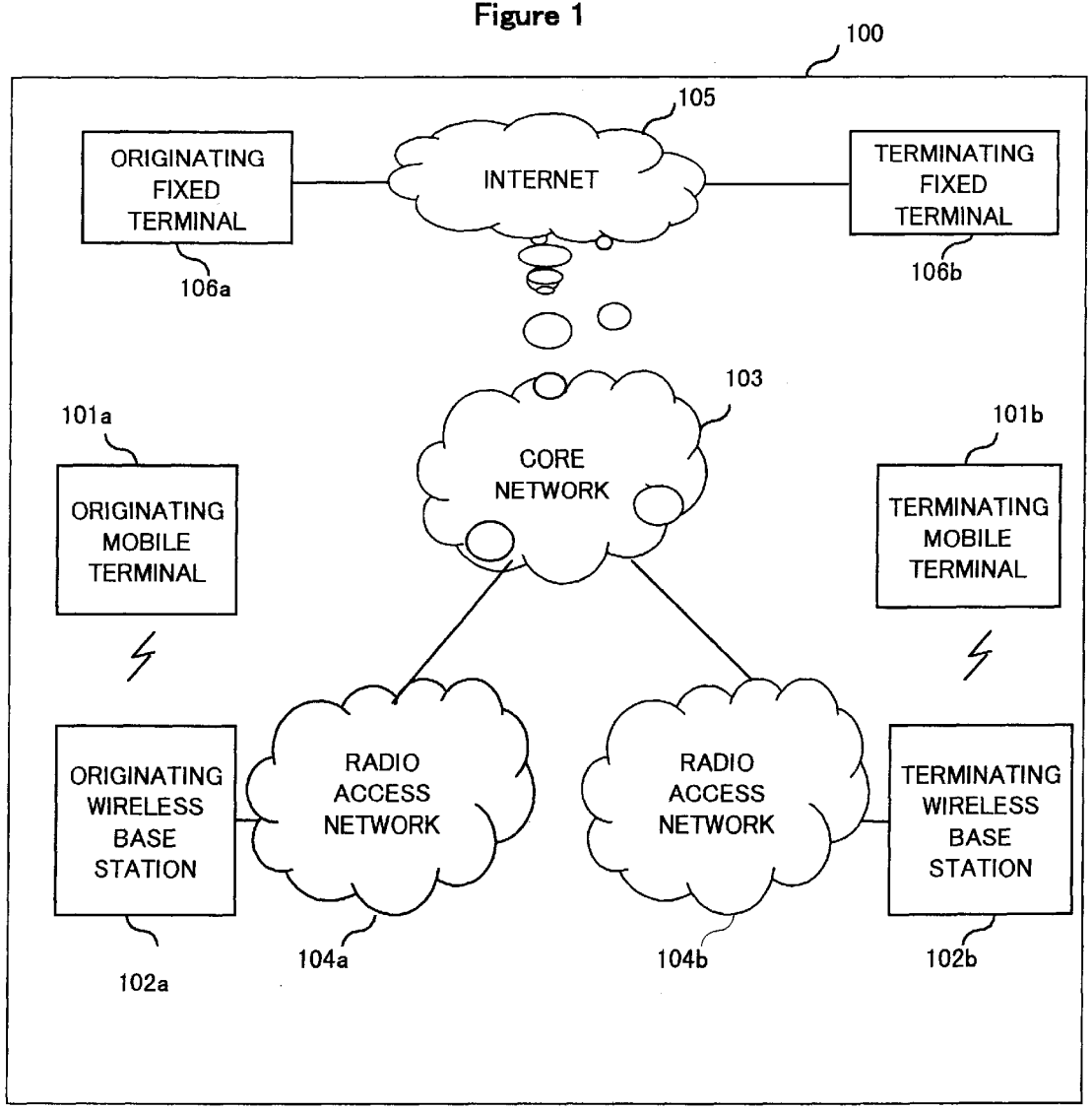
FIG. 1 is a diagram showing the configuration of a packet exchange network.

FIG. 1 shows an example of the configuration of a packet exchange network to which the invention is applied. An originating wireless base station 102a for transmitting/receiving packets by radio to/from an originating mobile terminal 101a is connected to a radio access network 104a. Similarly, a terminating wireless base station 102b for transmitting/receiving packets by radio to/from a terminating mobile terminal 101b is connected to a radio access network 104b. A core network 103 connects the radio access networks 104a and 104b to the Internet 105. An originating fixed terminal 106a and a terminating fixed terminal 106b are connected to the Internet 105.

A packet in a format used in the radio zone transmitted from the originating mobile terminal 101a to the terminating mobile terminal 106b is converted into a packet in a format used in the wire zone by the originating wireless base station 102a. After that, the resultant packet passes through the radio access networks 104a and 104b and the core network 103 and reaches the terminating wireless base station 102b. The packet is again converted into the packet in the format used in the radio zone by the terminating wireless base station 102b and the resultant packet reaches the terminating mobile terminal 101b.

On the other hand, a packet transmitted from the originating fixed terminal 106a connected to the Internet toward the terminating mobile terminal 101b passes through the Internet 105, core network 103, and radio access network 104b and reaches the terminating wireless base station 102b. The packet is converted into a packet in the format used in the radio zone for the first time by the terminating wireless base station 102b and the converted packet reaches the terminating mobile terminal 101b.

Generally, the upper limit of the bandwidth allocated to a packet in the radio zone is set and the bandwidth is managed on the basis of a unit called a channel. With respect to the packets transmitted between mobile terminals, since the maximum band is originally limited in the radio channel and a call setup control is executed at the time of channel setup so as to prevent buffer overflow in the base station controller when the packet in the wire zone in the downward direction is converted to the packet in the radio zone.

On the contrary, since the bandwidth control on the channel unit basis is not performed in the Internet, the originating fixed terminal 106a can transmit packets by using the maximum bandwidth. With respect to packets transmitted from the fixed terminal connected to the Internet toward a radio mobile terminal, due to causes such as no mechanism of limiting the bandwidth in the wire zone and no execution of the call setup control which is executed in the communications between mobile terminals, as long as the flow control is not performed upstream of the packet transmitted, there is the possibility that the buffer overflow occurs when the packet used in the wire zone is converted into the packet used in the radio zone by the base station controller. A downward traffic control method for preventing buffer overflow in the base station controller when a packet is transmitted from an internet terminal to a radio mobile terminal will be described in detail hereinbelow.

Figure 2:
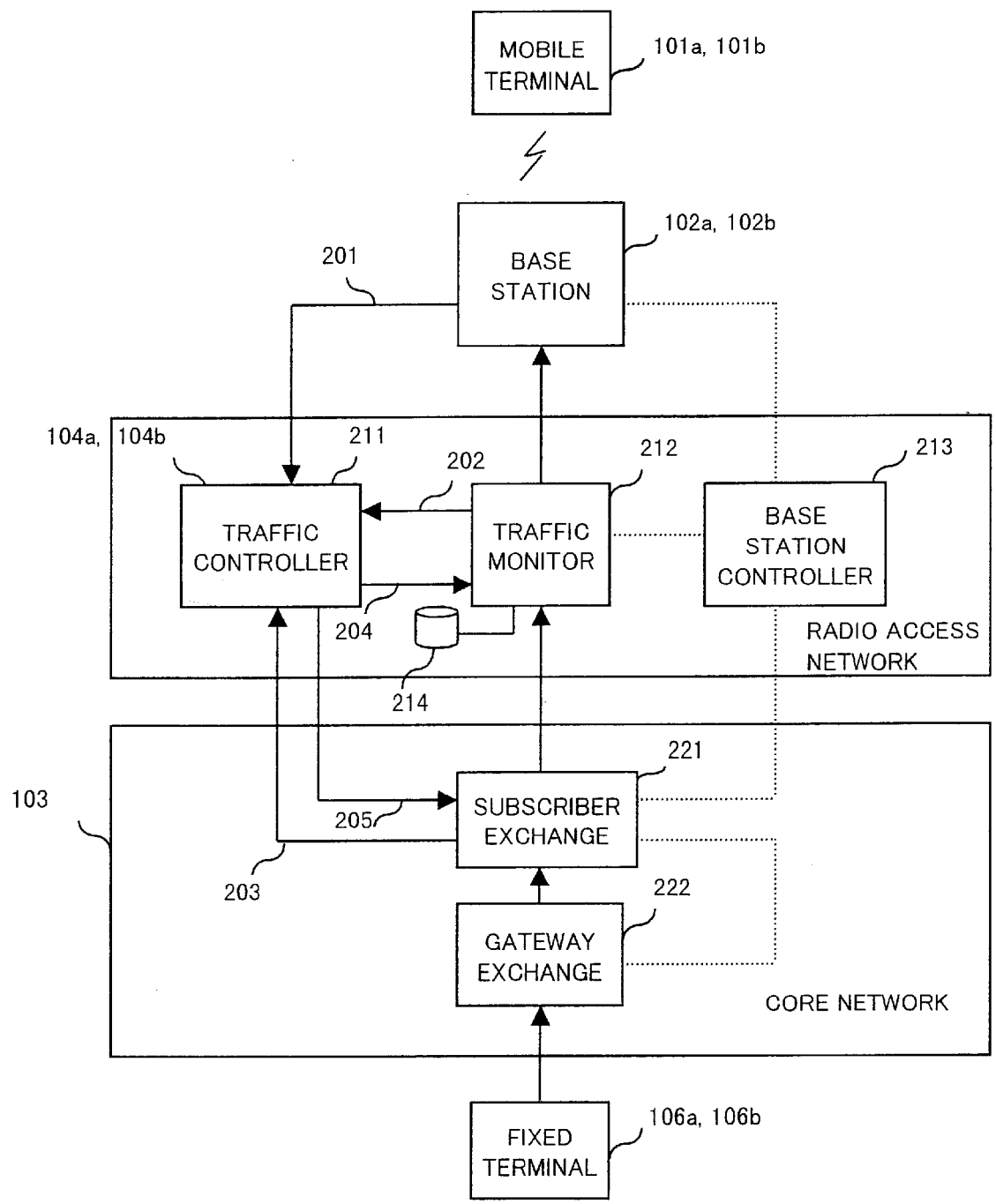
FIG. 2 is a diagrams showing the operation of a traffic control system for a data flow of a packet in the downward direction.

FIG. 2 shows an embodiment of a traffic control system regarding a packet in the downward direction from the fixed terminal to the mobile terminal. The wireless base stations 102a and 102b notify radio communication quality information, such as transmission power information carried on the packet in the upward direction transmitted from the mobile terminals 101a and 102b, to a traffic controller 211 by using a signal line 201.

A traffic monitor 212 measures, for each application, a traffic amount of the packets in the downward direction transmitted from the fixed terminals 106a and 106b and received by the originating mobile terminal 101b via a gateway exchange 222 and a subscriber exchange 221. The traffic monitor 212 reports the measured traffic amount information to the traffic controller 211 via a signal line 202. On the other hand, the traffic controller 211 notifies the traffic monitor 212 via a signal line 204 of parameters necessary for a traffic monitor report such as designation of an application of which traffic amount is to be measured, start and end of measurement, report frequency, and threshold. When the communication protocol used by the mobile terminals is the IP (Internet Protocol), since applications have different port numbers, the application can be designated by designating the port number.

A base station controller 213 performs operations such as allocation of a communication channel in the radio zone, management of the mobile terminals and, control of roaming which occurs in association with movement. In the embodiment, in order to explain the mechanism of a flow control regarding the packet in the downward direction, the traffic monitor 212 and the traffic controller 211 are separated from the base station controller 213. They can exist physically in the same apparatus.

The subscriber exchange 221 notifies the traffic controller 211 of the traffic quality information of each application by a signal 203. On the other hand, the traffic controller 211 notifies the subscriber exchange 221 of the flow control parameter information of the packet in the downward direction by using a signal line 205. The signal 201 carrying the radio communication quality information can be carried on the packet data traffic in the upward direction. The signal 203 carrying the, communication quality information of each application can be similarly carried on the packet data traffic in the downward direction. Since the signal 202 carrying the traffic amount information of each application cannot be transferred on the packet data traffic due to the construction of the apparatus shown in FIG. 2, it is carried via a signal line different from the packet data traffic.

Figure 3:
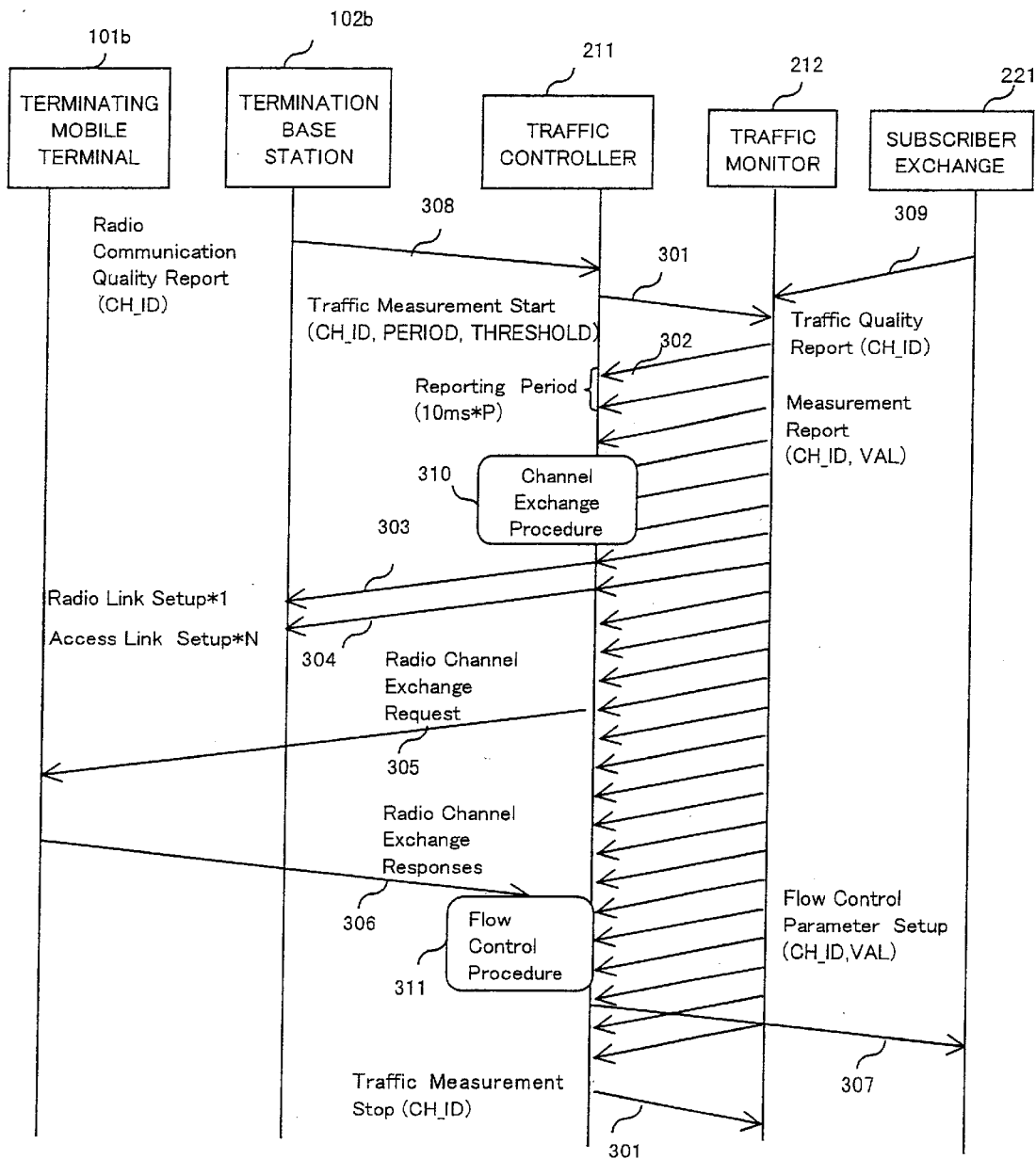
FIG. 3 is a diagram showing a channel switching procedure.

Referring to FIG. 3, the flow control sequence in the network shown in FIG. 2 will now be described.

As described above, the terminating wireless base station 102b reports radio communication quality information (radio communication quality report) 308 to the traffic controller 211 and the subscriber exchange 221 reports communication quality information (traffic quality report) 309 of each application to the traffic controller 211. Those signals do not always have to be transmitted synchronously with the packet data traffic in the downward direction. They can be transmitted upon occurrence of an event such as a change in the radio communication quality or a change in retransmission traffic.

On the other hand, it is desirable that the traffic amount information 202 is periodically reported from the viewpoint of its characteristic. The traffic amount information 202 may be also reported upon an event by setting a threshold therefore.

The traffic controller 211 instructs the start of measurement of the traffic amount by transmitting a signal 301 to the traffic monitor 212 with respect to an application on which the traffic monitor determined to measure. In this case, as shown in FIG. 4, an identifier 401 of a channel to be measured, measuring period 402, and a threshold 403 for generating a report as an event are designated as arguments. The measurement is finished similarly by designating the channel identifier 401 as an argument by using the signal 301.

In response to the designated channel identifier, the traffic monitor 212 measures the traffic amount of the packet in the downward direction passing through the traffic monitor 212 and reports the measured value to the traffic controller 211 in a designated cycle. By making a report periodically, the traffic controller 211 can obtain a time series pattern of the traffic amount. When the threshold is designated, irrespective of the designated cycle, the measured value is reported only at an event when the traffic amount per unit time exceeds the threshold. When the threshold is designated, signal traffic of reporting the traffic amount can be suppressed. In this case, however, the traffic controller 211 cannot obtain the time series pattern of the traffic amount. The threshold is therefore not set for the channel to which a flow control is desired to be performed on the basis of the accurate time series traffic pattern and the threshold is set for the channel to which a flow control is desired to be performed with only a simple threshold control.

The traffic controller 211 detects the occurrence of the threshold event or compares the time series traffic pattern with some determination reference with respect to a channel from which no report of the radio communication quality, change in the retransmission traffic, or the like is received. When the traffic controller 211 determined that the channel has to be switched, a channel switching procedure 310 is started. As a result, the base station controller 213 transmits a radio link setup signal 303 for setting a radio link between the terminating mobile terminal 101b and the terminating wireless base station 102b and an access link setup signal 304 for setting a (wired) access link between the wireless base station 102b and the base station controller 213 to the terminating wireless base station 102b.

Further, the base station controller 213 transmits a radio channel exchange or switching request signal 305 to the terminating mobile terminal 102b. By returning a radio channel exchange or switching response signal 306, the terminating mobile terminal 102b notifies the downward flow control parameters preliminarily calculated to the subscriber exchange 221 in accordance with a flow control procedure 311. As arguments of a signal 307 transmitted in the flow control procedure 311, for example, at least channel identifier and the maximum bandwidth allowable to the channel are necessary. As the maximum bandwidth allowable to the channel which is an indispensable element of flow control parameters, it is sufficient to designate a bandwidth having a capacity large enough to allow a traffic amount observed with respect to a channel corresponding to the application.

On the contrary, when a decrease in the traffic amount is observed and it is determined that the channel has to be switched to a channel of a smaller bandwidth, the channel exchange or switching procedure 310 and the flow control procedure 311 similar to the above are executed.

The above will be summarized in that the conditions of starting the channel exchange procedure 310 and the flow control procedure 311 are (1) when either occurrence of the threshold event from the subscriber exchange 221 is detected or the traffic controller 211 determines that the channel has to be switched on the basis of the time series traffic pattern with respect to a channel in which there is no degradation in the radio communication quality and a change such as an increase or decrease in the retransmission traffic is not reported and (2) when it is determined is that the channel in which there is no degradation in the radio communication quality and a change such as increase or decrease in the retransmission traffic is reported has to be switched irrespective of the traffic amount reported. In cases other than (1) and (2), even when an increase or decrease in the traffic amount is detected, it is regarded as an increase in invalid traffic such as retransmission traffic due to degradation in the radio communication quality or the like and the flow control is not executed.

Figure 5:
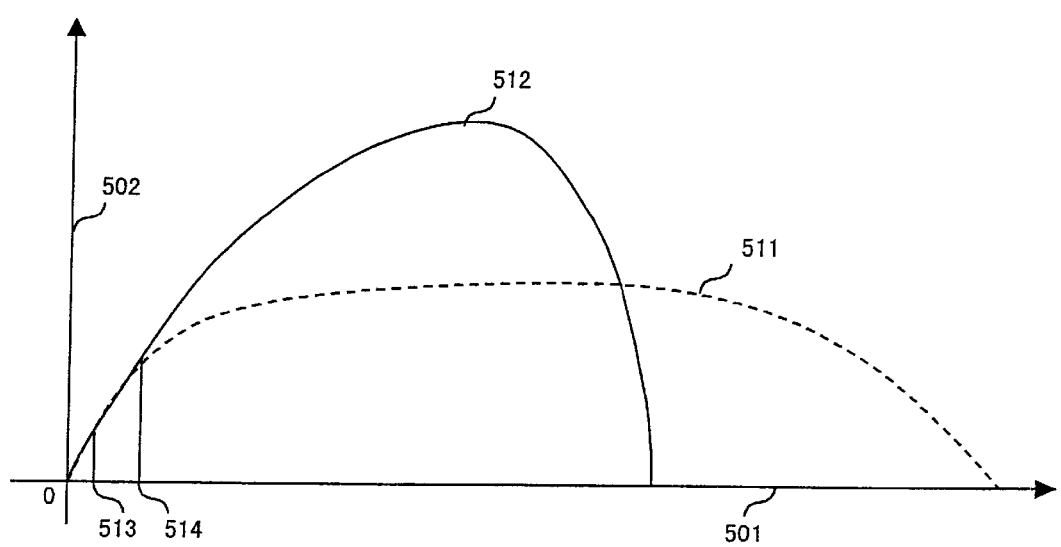
FIG. 5 is a diagram showing the result of comparison between a time series pattern of traffic accompanying no channel switching and a time series pattern of traffic accompanying channel switching.

Finally, referring to the graph of FIG. 5, effects of the channel switching and the flow control performed during the transfer of the packets in the downward direction will be described. The lateral axis 501 of the graph denotes time and the vertical axis 502 shows the throughput per unit time. Reference numeral 512 indicates a traffic pattern of a case where the channel switching and the flow control are performed during a transfer and reference numeral 511 shows a traffic pattern of a case where the channel switching is not performed. It is assumed in FIG. 5 that the channel switching procedure is executed at time 513 and the flow control procedure operates at time 514.

As shown in FIG. 3, the process of setting and releasing the radio resources is necessary in the radio zone and the process of setting and releasing the radio access link is necessary in the wire zone. Time of the order of several seconds is therefore usually required since the execution of the channel switching procedure until the flow control actually starts. Even when the traffic amount is reported, for example, at the order of few tens milliseconds, since long time is necessary to execute the channel switching procedure and the flow control procedure, it is not so effective on improvement in throughput or the like.

The proper frequency of reporting the traffic amount is therefore considered to be the order of seconds. It can be said that a value of 100 or larger is sufficient as the report period 402 shown in FIG. 4 when 10 milliseconds is set as the minimum resolution. The practicability of the traffic control system based on the configuration of FIG. 2 is therefore high.

According to the present invention, the radio communication quality information is obtained in the wireless base station, the traffic amount information of packets in the downward direction is obtained by the traffic monitor, and the communication quality information corresponding to the application is obtained by the subscriber exchange. That is, the collection of the parameters necessary for the traffic control is carried out by a plurality of appropriate apparatuses which can easily obtain the information, respectively, and the load to notifying the parameters to the traffic controller is shared by these apparatuses. Thus, a practically balanced traffic control system can be constructed.

Since the increase/decrease in the retransmission traffic amount due to degradation in the radio communication quality can be distinguished from the increase/decrease in the effective traffic, which cannot be conventionally distinguished, the present invention can eliminate the execution of a meaningless flow control which has been performed in the conventional method due to an increase in retransmission traffic occurring in association with the degradation in the radio communication quality. Consequently, there is an effect such that the very strong, practical flow control system can be constructed. Further, since the traffic control system and the flow control system are implemented on the mobile terminal network side without modifying the conventional traffic control mechanism of the Internet, according to the present invention, it is smooth to make the Internet adapted to the mobile terminal.

What is claimed is:

1. A communication control method in a network connected to both a wireless base station for communicating with a mobile wireless via a radio communication channel and an Internet protocol network, comprising the steps of:

monitoring a traffic amount of data transmitted from the Internet protocol network to the mobile terminal for each of a plurality of data flows;

classifying the traffic amount into a retransmission traffic amount and an effective traffic amount for each data flow;

collecting communication quality information for each data flow; and changing a bandwidth between the Internet protocol network and the wireless base station based on the communication quality information and the traffic amount as classified into the retransmission traffic amount and the effective traffic amount, when the monitored traffic amount has changed.

2. A communication control method according to claim 1, further comprising the step of:

monitoring the bandwidth between the Internet protocol network and the wireless base station unchanged if the monitored traffic amount has increased due to a degradation in communication as indicated by the communication quality information.

3. A communication control method according to claim 1, further comprising the step of:

monitoring the bandwidth between the Internet protocol network and the wireless base station unchanged if the retransmission traffic amount has increased.

* * * * *